(12) United States Patent
Yi et al.

(10) Patent No.: US 10,834,763 B2
(45) Date of Patent: Nov. 10, 2020

(54) METHOD AND APPARATUS FOR HANDLING OVERLAP OF DIFFERENT CHANNELS IN WIRELESS COMMUNICATION SYSTEM

(71) Applicant: LG ELECTRONICS INC., Seoul (KR)

(72) Inventors: Yunjung Yi, Seoul (KR); Suckchel Yang, Seoul (KR); Daesung Hwang, Seoul (KR); Hyangsun You, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 206 days.

(21) Appl. No.: 15/771,690

(22) PCT Filed: Nov. 4, 2016

(86) PCT No.: PCT/KR2016/012666
§ 371 (c)(1),
(2) Date: Apr. 27, 2018

(87) PCT Pub. No.: WO2017/078465
PCT Pub. Date: May 11, 2017

(65) Prior Publication Data
US 2018/0352582 A1    Dec. 6, 2018

Related U.S. Application Data

(60) Provisional application No. 62/251,083, filed on Nov. 4, 2015.

(51) Int. Cl.
*H04W 74/08* (2009.01)
*H04W 72/12* (2009.01)
(Continued)

(52) U.S. Cl.
CPC ... *H04W 74/0858* (2013.01); *H04W 72/1257* (2013.01); *H04W 72/1284* (2013.01); *H04W 74/006* (2013.01); *H04W 76/28* (2018.02)

(58) Field of Classification Search
None
See application file for complete search history.

(56) References Cited

U.S. PATENT DOCUMENTS 10,244,521 B2 * 3/2019 Fu ................. H04L 1/1822
2007/0268848 A1 * 11/2007 Khandekar .......... H04B 7/2656
370/295
(Continued)

OTHER PUBLICATIONS

PCT International Application No. PCT/KR2016/012666, Written Opinion of the International Searching Authority dated Feb. 15, 2017, 34 pages.
(Continued)

*Primary Examiner* — Parth Patel
*Assistant Examiner* — Berhanu D Belete
(74) *Attorney, Agent, or Firm* — Lee, Hong, Degerman, Kang & Waimey

(57) ABSTRACT

A method and apparatus for handling overlap of multiple channels in a wireless communication system is provided. A user equipment (UE), which operates in half-duplex frequency division duplex (FDD), determines that a periodic uplink (UL) transmission collides with a physical downlink shared channel (PDSCH) reception in a subframe, and performs either the periodic UL transmission or the PDSCH reception in the subframe. When the periodic UL transmission corresponds to a semi-persistent scheduled (SPS) physical uplink shared channel (PUSCH), the PDSCH reception is performed.

14 Claims, 10 Drawing Sheets

(51) Int. Cl.
*H04W 76/28* (2018.01)
*H04W 74/00* (2009.01)

(56) References Cited

U.S. PATENT DOCUMENTS

| | | | | |
|---|---|---|---|---|
| 2009/0135748 | A1* | 5/2009 | Lindoff | H04W 72/082 370/296 |
| 2012/0155436 | A1* | 6/2012 | Lindoff | H04W 72/1257 370/336 |
| 2013/0242815 | A1 | 9/2013 | Wang et al. | |
| 2013/0242824 | A1* | 9/2013 | Lee | H04W 72/0446 370/281 |
| 2013/0250772 | A1* | 9/2013 | Yin | H04L 1/1822 370/241 |
| 2013/0308503 | A1* | 11/2013 | Kim | H04L 5/0053 370/280 |
| 2014/0029490 | A1 | 1/2014 | Kim et al. | |
| 2015/0029905 | A1 | 1/2015 | Yi et al. | |
| 2015/0043458 | A1* | 2/2015 | Seo | H04L 1/1861 370/329 |
| 2016/0219546 | A1* | 7/2016 | Ahn | H04L 5/001 |
| 2016/0219583 | A1* | 7/2016 | Blankenship | H04W 72/1205 |
| 2016/0254901 | A1* | 9/2016 | You | H04W 52/0216 370/281 |
| 2016/0330011 | A1* | 11/2016 | Lee | H04L 5/1461 |
| 2017/0085360 | A1* | 3/2017 | Lee | H04L 5/0055 |
| 2017/0257878 | A1* | 9/2017 | Kazmi | H04L 5/14 |
| 2018/0255549 | A1* | 9/2018 | Langereis | H04W 72/042 |
| 2019/0158263 | A1* | 5/2019 | Lee | H04L 5/143 |

OTHER PUBLICATIONS

Ericsson, "PUSCH transmission for MTC," 3GPP TSG-RAN WG1 #82bis, R1-155034, Oct. 2015, 8 pages.

Qualcomm Incorporated, "PUSCH Design Options," 3GPP TSG-RAN WG1 #82bis, R1-155707, Oct. 2015, 6 pages.

* cited by examiner

METHOD AND APPARATUS FOR HANDLING OVERLAP OF DIFFERENT CHANNELS IN WIRELESS COMMUNICATION SYSTEM

CROSS-REFERENCE TO RELATED APPLICATIONS

This application is the National Stage filing under 35 U.S.C. 371 of International Application No. PCT/KR2016/012666, filed on Nov. 4, 2016, which claims the benefit of U.S. Provisional Application No. 62/251,083, filed on Nov. 4, 2015 the contents of which are all hereby incorporated by reference herein in their entirety.

BACKGROUND OF THE INVENTION

Field of the Invention

The present invention relates to wireless communications, and more particularly, to a method and apparatus for handling overlap of different channels in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

In the future versions of the LTE-A, it has been considered to configure low-cost/low-end (or, low-complexity) user equipments (UEs) focusing on the data communication, such as meter reading, water level measurement, use of security camera, vending machine inventory report, etc. For convenience, these UEs may be called machine type communication (MTC) UEs. Since MTC UEs have small amount of transmission data and have occasional uplink data transmission/downlink data reception, it is efficient to reduce the cost and battery consumption of the UE according to a low data rate. Specifically, the cost and battery consumption of the UE may be reduced by decreasing radio frequency (RF)/baseband complexity of the MTC UE significantly by making the operating frequency bandwidth of the MTC UE smaller.

As data traffic occurs occasionally rather than continuously for a MTC UE, regular measurement and reporting based channel estimation may not work very effectively. Moreover, once a MTC device has completed transmission of data, it is likely to go into sleep mode. Thus, it would be desirable to enable "one-time" reliable transmission rather than multiple transmissions based on acknowledgement/non-acknowledgement (ACK/NACK) process. Furthermore, it is expected that MTC devices will be installed in, e.g. basement, indoor, inside of buildings, etc., in which coverage may be limited. Thus, improving downlink and uplink coverage may be essential.

Further, the MTC UE may not have ability to transmit multiple channels simultaneously. Accordingly, when multiple channels are overlapped with each other, a method for handling overlap of different channels may be required.

SUMMARY OF THE INVENTION

The present invention relates to wireless communications, and more particularly, to a method and apparatus for handling overlap of different channels in a wireless communication system. The present invention addresses overlap/collision priority among different channels, focused on uplink transmissions and downlink/uplink transmission in half-duplex frequency division duplex (FDD) case, when more than one transmission time interval (TTI) is used for transmission via repetition.

In an aspect, a method for handling overlap of multiple channels by a user equipment (UE), which operates in half-duplex frequency division duplex (FDD), in a wireless communication system is provided. The method includes determining that a periodic uplink (UL) transmission collides with a physical downlink shared channel (PDSCH) reception in a subframe, and performing either the periodic UL transmission or the PDSCH reception in the subframe.

In another aspect, a user equipment (UE), which operates in half-duplex frequency division duplex (FDD), in a wireless communication system is provided. The UE includes a memory, a transceiver, and a processor, coupled to the memory and the transceiver, that determines that a periodic uplink (UL) transmission collides with a physical downlink shared channel (PDSCH) reception in a subframe, and controls the transceiver to perform either the periodic UL transmission or the PDSCH reception in the subframe.

A MTC UE may handle overlap of multiple channels efficiently.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

Figure 1:
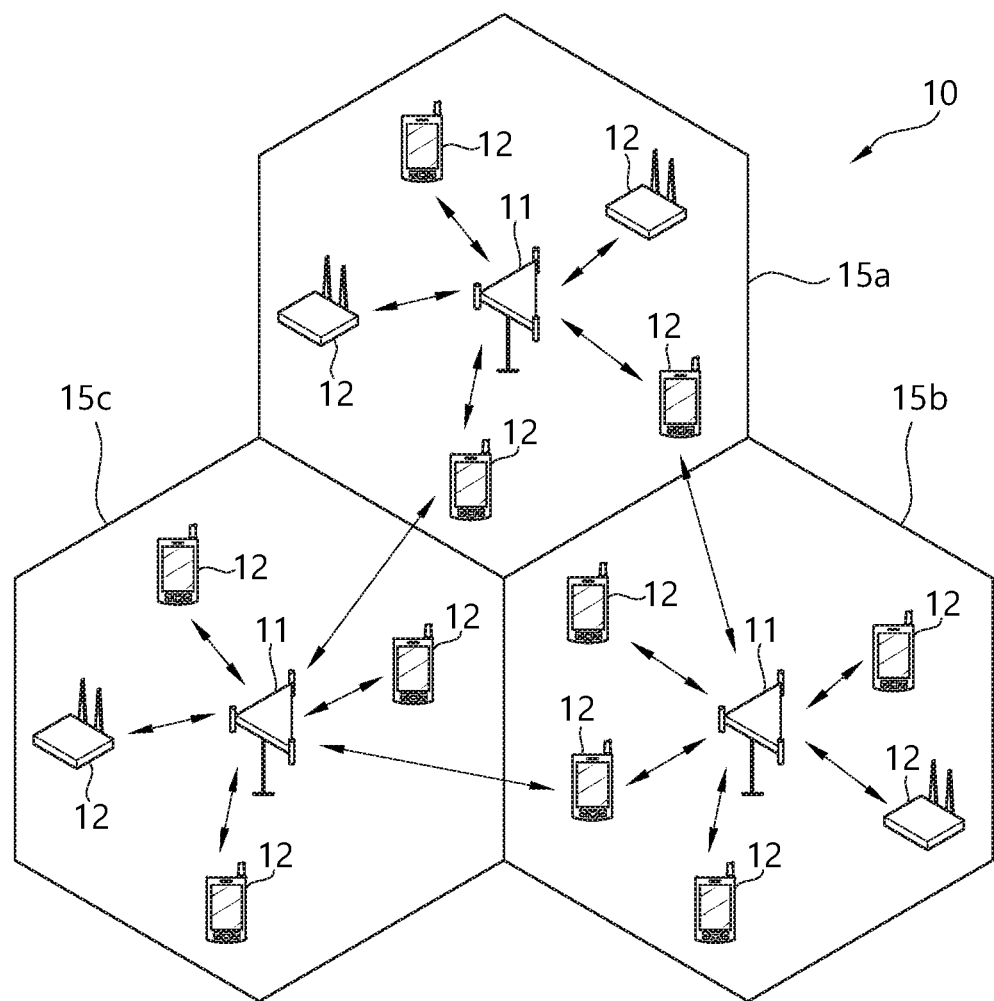
FIG. 1 shows a wireless communication system.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
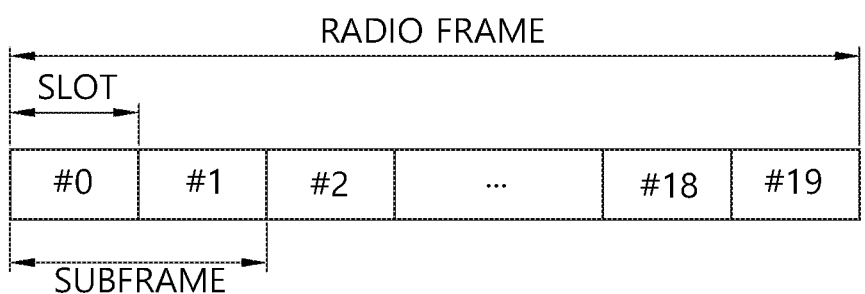
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms.

One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

Figure 3:
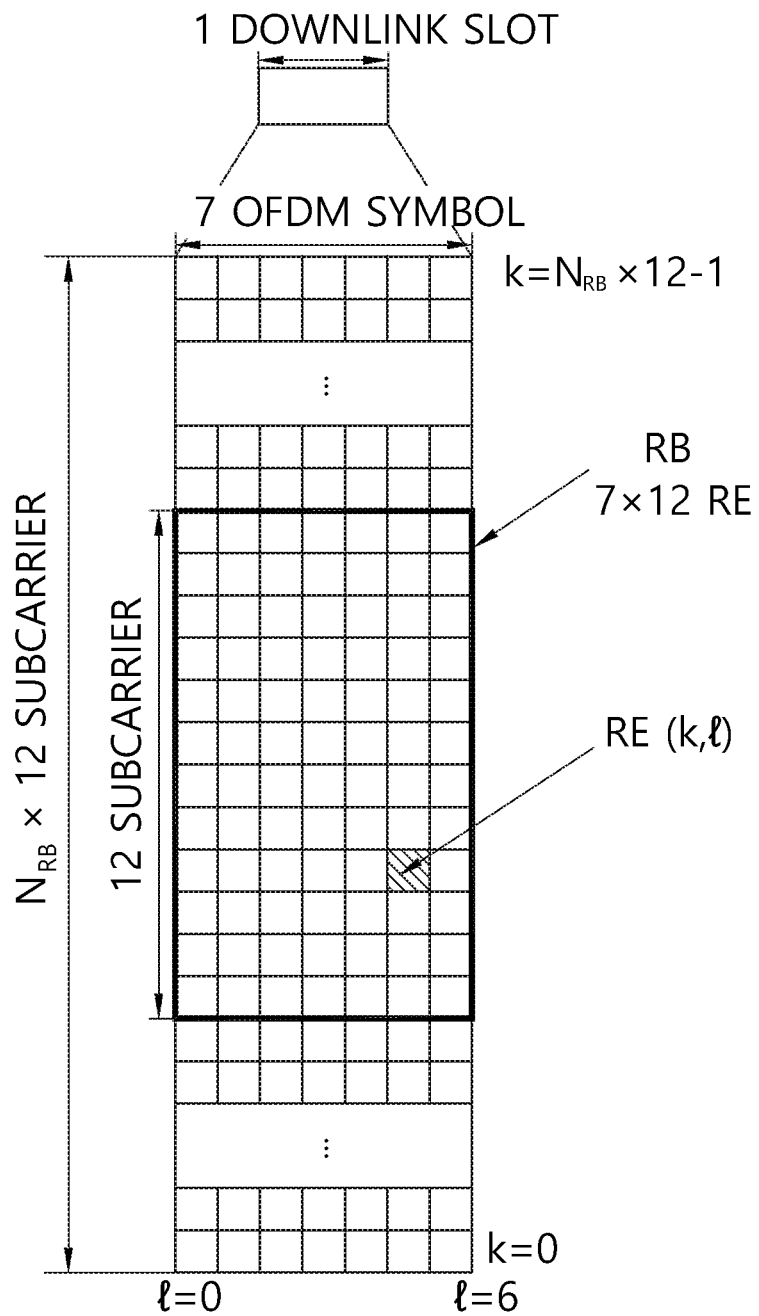
FIG. 3 shows a resource grid for one downlink slot.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
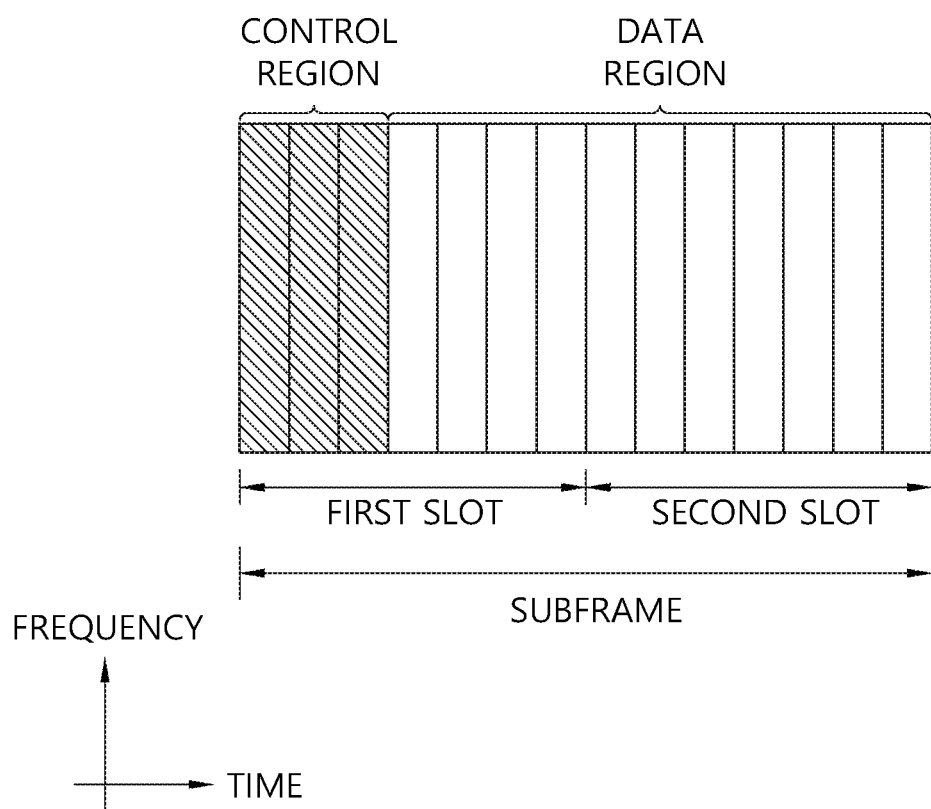
FIG. 4 shows structure of a downlink subframe.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PC-FICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (TX) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of TX power control commands on individual UEs within an arbitrary UE group, a TX power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

Figure 5:
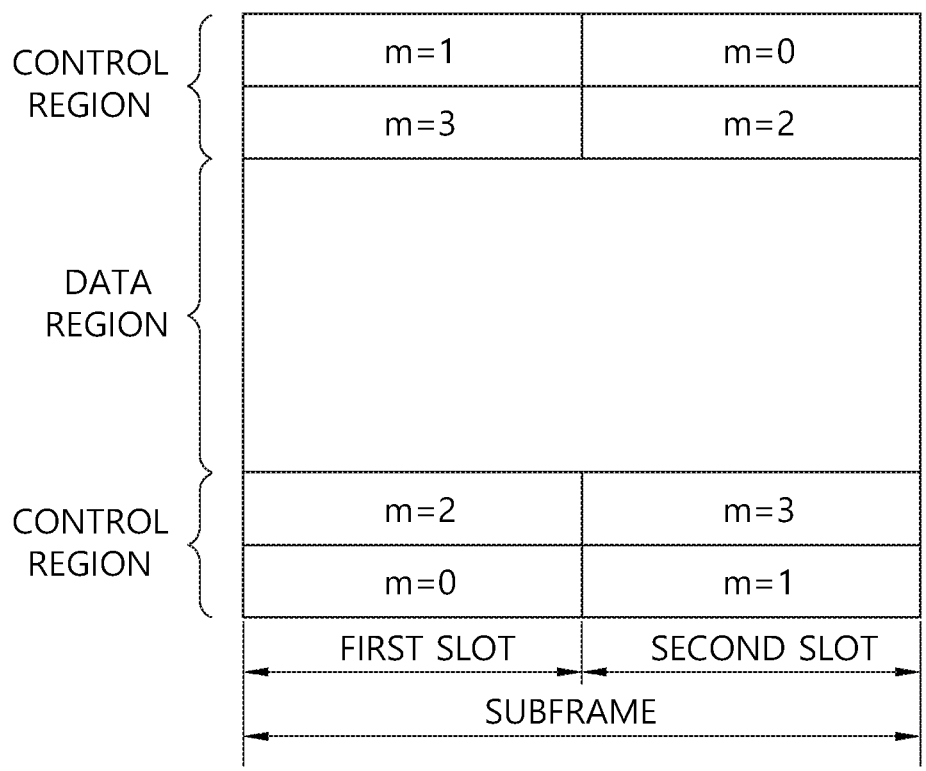
FIG. 5 shows structure of an uplink subframe.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

In the UL, E-UTRAN can dynamically allocate resources (physical resource blocks (PRBs) and modulation and coding scheme (MCS)) to UEs at each TTI via the C-RNTI on PDCCH(s). A UE always monitors the PDCCH(s) in order to find possible allocation for UL transmission when its DL reception is enabled (activity governed by discontinuous reception (DRX) when configured). When carrier aggregation (CA) is configured, the same C-RNTI applies to all serving cells.

In addition, E-UTRAN can allocate a semi-persistent UL resource for the first HARQ transmissions and potentially retransmissions to UEs: A radio resource control (RRC) defines the periodicity of the semi-persistent UL grant. PDCCH indicates whether the UL grant is a semi-persistent one, i.e. whether it can be implicitly reused in the following TTIs according to the periodicity defined by RRC.

In the subframes where the UE has semi-persistent UL resource, if the UE cannot find its C-RNTI on the PDCCH(s), a UL transmission according to the semi-persistent allocation that the UE has been assigned in the TTI can be made. The network performs decoding of the pre-defined PRBs according to the pre-defined MCS. Otherwise, in the sub-frames where the UE has semi-persistent UL resource, if the UE finds its C-RNTI on the PDCCH(s), the PDCCH allocation overrides the persistent allocation for that TTI and the UE's transmission follows the PDCCH allocation, not the semi-persistent allocation. Retransmissions are either implicitly allocated in which case the UE uses the semi-persistent UL allocation, or explicitly allocated via PDCCH(s) in which case the UE does not follow the semi-persistent allocation.

In the current LTE specification, all UEs shall support maximum 20 MHz system bandwidth, which requires baseband processing capability to support 20 MHz bandwidth. To reduce hardware cost and battery power of MTC UEs, reducing bandwidth is a very attractive option. To enable narrowband MTC UEs, the current LTE specification shall be changed to allow narrowband UE category. If the serving cell has small system bandwidth (smaller than or equal to bandwidth that narrow-band UE can support), the UE can attach based on the current LTE specification.

For example, a MTC UE may operate in reduced UE downlink and/or uplink bandwidth of 1.4 MHz (i.e. 6 PRBs), regardless of operating system bandwidth of a cell. A subband in which a MTC UE operates (i.e. MTC subband) may be located in a center of the system bandwidth (e.g. center 6 PRBs). Alternatively, multiple subbands in which multiples MTC UEs operates may be allocated in one subframe for multiplexing of the multiple MTC UEs. In this case, the multiple UEs may use different subbands from each other, or, may use the same subband (not center 6 PRBs).

Further, a MTC UE may operate in further reduced UE downlink and/or uplink bandwidth of 200 kHz (i.e. 1 PRB). The MTC UE may operate in a legacy cell which has a system bandwidth wider than 200 kHz with backward compatibility. This system may be referred to as in-band narrow-band (NB) LTE. Alternatively, the MTC UE may operate in a frequency, in which the legacy cell does not exist and only for the MTC UE. This system may be referred to as stand-alone LTE.

When the MTC UE operates in the reduced bandwidth, the MTC UE may not receive legacy PDCCH transmitted via whole system bandwidth. Further, it may not be desirable that a PDCCH for the MTC UE is received in OFDM symbols in which the legacy PDCCH is received due to multiplexing issues with PDCCH transmitted to another UE. Accordingly, a new physical DL control channel transmitted in a subband in which the MTC UE operates may be introduced for the MTC UE. The new physical DL control channel for the MTC UE (or, low-complexity UE) may be an existing enhanced PDCCH (EPDCCH) or may be a modified version of PDCCH/EPDCCH. Hereinafter, the new physical DL control channel may be referred to as an M-PDCCH (MTC-PDCCH).

Low complexity UEs are targeted to low-end (e.g. low average revenue per user, low data rate, delay tolerant) applications, e.g. some MTC. A low complexity UE has reduced Tx and Rx capabilities compared to other UE of different categories. Among low complexity UEs, a bandwidth reduced low complexity (BL) UE may operate in any LTE system bandwidth but with a limited channel bandwidth of 6 PRBs (corresponding to the maximum channel bandwidth available in a 1.4 MHz LTE system) in DL and UL. A BL UE may a transport block size (TBS) limited to 1000 bit for broadcast and unicast.

Coverage enhancement (CE) for the MTC UE is described. When a UE performs initial access towards a specific cell, the UE may receive master information block (MIB), SIB and/or RRC parameters for the specific cell from an eNB which controls the specific cell. Further, the UE may receive PDCCH/PDSCH from the eNB. In this case, the MTC UE should have broader coverage than the legacy UE. Accordingly, if the eNB transmits MIB/SIB/RRC parameters/PDCCH/PDSCH to the MTC UE with same scheme as the legacy UE, the MTC UE may have difficulty for receiving MIB/SIB/RRC parameters/PDCCH/PDSCH. To solve this problem, when the eNB transmits MIB/SIB/RRC parameters/PDCCH/PDSCH to the MTC UE having coverage issue, the eNB may apply various schemes for coverage enhancement, e.g. subframe repetition, subframe bundling, etc.

When a MTC UE having coverage issue uses the same service in the same cell with a legacy UE or a MTC UE not having coverage issue, a large amount of resources may be used to transmit data to the MTC UE having coverage issue. It may restrict services for other UEs. Therefore, in order to avoid the problem that an operation for the MTC UE having coverage issue may interference an operation for other UEs, a time region for the MTC UE having coverage issue and a time region for other UEs may be multiplexed by time division multiplexing (TDM). The time region for the MTC UE having coverage issue and time region for other UEs may be multiplexed with a long-term period, e.g. tens of minutes, or with a short-term period, e.g. some subframes.

In LTE-A, it has been discussed that repetition is applied to each channel for the MTC UE having coverage issue. That is, each channel may be transmitted with repetition for coverage enhancement of the MTC UE having coverage issue.

Hereinafter, a MTC UE, a UE requiring coverage enhancement (CE), a low cost UE, a low end UE, a low complexity UE, a narrow(er) band UE, a small(er) band UE, a new category UE, a BL UE, or narrowband internet-of-things (NB-IoT) UE, or NB-LTE UE may have the same meaning, and may be used mixed. Or, just a UE may refer one of UEs described above. Further, in the description below, a case where system bandwidth of available cells is larger than bandwidth that new category narrowband UEs can support may be assumed. For the new category UE, it may be assumed that only one narrow-band is defined. In other words, all narrow-band UE shall support the same narrow bandwidth smaller than 20 MHz. It may be assumed that the narrow bandwidth is larger than 1.4 MHz (6 PRBs). However, the present invention can be applied to narrower bandwidth less than 1.4 MHz as well (e.g. 200 kHz), without loss of generality. In these cases, the UE may be able to receive only a limited number of PRBs or subcarriers. Furthermore, in terms of UL transmission, a UE may be configured or scheduled with single or less than 12 tones (i.e. subcarriers) in one UL transmission to enhance the coverage by improving peak-to-average power ratio (PAPR) and channel estimation performance.

Hereinafter, a method for handling overlap of multiple UL channels according to an embodiment of the present invention is described. Simultaneous transmission of PUCCH/PUSCH may not be expected to be configured to MTC UE (hereafter, just UE). In terms of simultaneous transmission of PUCCH/PUSCH, it may be expected that eNB should avoid collision, so the UE needs to drop one transmission. Generally, aperiodic UL transmission or grant-based UL transmission or new UL transmission may get a higher priority than periodic UL transmission. Also, physical random access channel (PRACH) may get the highest priority, and positive SR may get the second highest priority. When any transmission of one channel is dropped due to transmission of other channel, it may be dropped entirely and retransmission may be attempted afterwards (in case of aperiodic transmission). Or, it may be delayed/postponed until transmission of the higher priority channel finishes.

Table 1 shows an example of handling of on-going transmission and new transmission in UL transmission.

TABLE 1

| On-going transmission | New transmission | Handling |
| --- | --- | --- |
| Periodic CSI, SPS PUSCH | Periodic CSI, SPS PUSCH | Considered as misconfiguration. Up to UE implementation |
| Periodic CSI, SPS PUSCH | PUSCH via UL grant | Considered as valid UL grant. Drop on-going transmission |
| Aperiodic CSI reporting via PUSCH, UL grant PUSCH | SPS PUSCH | Drop SPS PUSCH |
| Aperiodic CSI reporting via PUSCH, PUSCH | HARQ-ACK on PUCCH | A/N piggyback on PUSCH (until PUSCH ends) -> continue with PUCCH if repetition of PUCCH is not finished |

TABLE 1-continued

| On-going transmission | New transmission | Handling |
| --- | --- | --- |
| HARQ-ACK on PUCCH | Aperiodic CSI reporting via PUSCH, PUSCH | A/N piggyback on PUSCH (until PUSCH or PUCCH repetition ends) -> continue with PUSCH if repetition of PUSCH is not finished |
| HARQ-ACK on PUCCH | HARQ-ACK on PUCCH | Considered as early termination. Stop on-going transmission, and start new transmission |
| HARQ-ACK on PUSCH | HARQ-ACK on PUSCH | Considered as early termination. Stop on-going transmission, and start new transmission |
| PUSCH via UL grant | PUSCH via UL grant | Considered as early termination, or eNB wants to start new transmission. Stop on-going transmission, and start new transmission |
| PUSCH via UL grant | SPS PUSCH | Drop SPS PUSCH |
| Periodic CSI or SPS PUSCH | Msg 3 or Msg 3 retx | RACH procedure has higher priority over other channels |
| Any data transmission | SRS | Drop SRS |

Table 2 shows another example of handling of on-going transmission and new transmission in UL transmission.

TABLE 2

| On-going transmission | New transmission | Handling |
| --- | --- | --- |
| Periodic CSI, SPS PUSCH | Periodic CSI, SPS PUSCH | Considered as misconfiguration. Up to UE implementation |
| Periodic CSI, SPS PUSCH | PUSCH via UL grant, HARQ-ACK PUCCH | Considered as valid UL grant. Drop on-going transmission |
| Aperiodic CSI reporting via PUSCH, UL grant PUSCH | SPS PUSCH | Drop SPS PUSCH |
| Aperiodic CSI reporting via PUSCH, UL grant PUSCH | HARQ-ACK on PUCCH | Considered as early termination. Stop on-going transmission, and start new transmission |
| HARQ-ACK on PUCCH | Aperiodic CSI reporting via PUSCH, PUSCH | Considered as early termination. Stop on-going transmission, and start new transmission |
| HARQ-ACK on PUCCH | HARQ-ACK on PUCCH | Considered as early termination. Stop on-going transmission, and start new transmission |
| HARQ-ACK on PUSCH | HARQ-ACK on PUSCH | Considered as early termination. Stop on-going transmission, and start new transmission |
| HARQ-ACK on PUCCH or PUSCH via UL grant | Periodic CSI, SPS PUSCH | HARQ-ACK or UL grant has higher priority. Drop periodic CSI or SPS PUSCH |
| PUSCH via UL grant | PUSCH via UL grant | Considered as early termination, or eNB wants to start new transmission. Stop on-going transmission, and start new transmission |
| Periodic CSI or SPS PUSCH | Msg 3 or Msg 3 retx | RACH procedure has higher priority over other channels |

Table 3 shows another example of handling of on-going transmission and new transmission in UL transmission.

TABLE 3

| On-going transmission | New transmission | Handling |
| --- | --- | --- |
| Periodic CSI, periodic SRS, SPS PUSCH, | Periodic CSI, periodic SRS, SPS PUSCH | Considered as misconfiguration. Up to UE implementation |
| Periodic CSI, periodic SRS, SPS PUSCH, | PUCCH HARQ-ACK | New transmission gets higher priority. Drop on-going transmission. For SRS, it may be used with shortened PUCCH format |
| Periodic CSI reporting via PUCCH, periodic SRS, | PUSCH via UL grant | Considered as valid UL grant. Drop periodic CSI. For SRS shortened PUSCH may be used |
| Aperiodic CSI reporting via PUSCH, PUSCH | SPS PUSCH | Drop SPS PUSCH (UL grant has always priority over SPS PUSCH) |

TABLE 3-continued

| On-going transmission | New transmission | Handling |
|---|---|---|
| Aperiodic CSI reporting via PUSCH, PUSCH | PUCCH HARQ-ACK corresponding to DL grant | Drop CSI reporting. Since DL grant triggers PUCCH transmission, prioritize later transmission |
| Aperiodic CSI reporting via PUSCH, PUSCH | PUCCH corresponding to SPS PDSCH | A/N piggyback on PUSCH (until PUSCH ends) –> continue with PUCCH if repetition of PUCCH is not finished. Alternatively, Drop SPS PDSCH A/N or Drop aperiodic CSI reporting if piggyback is not supported |
| HARQ-ACK on PUCCH | HARQ-ACK on PUCCH | Considered as early termination. Stop on-going transmission, and start new transmission, i.e. later transmission gets priority. Alternatively earlier transmission gets priority |
| HARQ-ACK on PUSCH | HARQ-ACK on PUSCH | Considered as early termination. Stop on-going transmission, and start new transmission, i.e. later transmission gets priority. |
| SPS PUSCH | PUSCH via UL grant | Considered as early termination, or eNB wants to start new transmission. Stop on-going transmission, and start new transmission UL grant gets higher priority over SPS PUSCH |
| PUSCH via UL grant | SPS PUSCH | Drop SPS PUSCH UL grant gets higher priority |
| Periodic CSI or SPS PUSCH or UL grant PUSCH | Msg 3 or Msg 3 retx | RACH procedure has higher priority over other channels Or up to UE implementation |
| Any data transmission | SRS | Drop SRS |
| SRS | Any data transmission | Drop SRS |
| Positive SR | HARQ-ACK PUCCH | Stop only SR transmission, transmit SR + PUCCH afterwards (till end of PUCCH repetition or till end of SR repetition subframe of this instance) |
| Positive SR | PUSCH | Stop SR transmission, if buffer status report (BSR) can be added to PUSCH, transmit BSR + PUSCH, otherwise, transmit PUSCH only. Generally, transmit BSR |
| Positive SR | CSI PUCCH | Drop CSI PUCCH, SR has higher priority over periodic UL transmission |
| PRACH | Other channel | PRACH gets always priority. |
| Other channel | PRACH | PRACH gets always priority |
| SPS retransmission | SPS PUSCH | SPS retransmission is considered as UL grant. Thus, SPS retransmission has higher priority |

If the network does not support early termination, priorities between multiples channels described above in Table 1 to 3 may be obeyed regardless of on-going or new transmission (e.g. PUCCH HARQ-ACK gets higher priority over PUSCH). In this case, when same channels collide with each other, earlier transmission may get a higher priority. The same principle may apply to other cases (half-duplex, downlink transmissions as well)

In half-duplex FDD operation, the UE cannot transmit and receive at the same time while there are no such restrictions in full-duplex FDD. In half-duplex FDD operation, it is expected that a UE will switch to UL transmission whenever there is a scheduled PUSCH or PUCCH transmission. Until the UL transmission ends, the UE may not switch back to DL reception, unless it is configured to do otherwise. Thus, it is expected that a UE may switch to UL transmission while it is receiving PDSCH repetition if UL transmission is scheduled per the current behaviour of half-duplex. Most cases of collision of DL reception and UL transmission in half-duplex FDD operation should be handled by network scheduling. However, collision of DL reception and any periodically configured UL transmission, such as periodic CSI feedback, SR transmission, periodic SRS, and SPS PUSCH transmission, etc., should be addressed.

If any unicast PDSCH reception collides with periodic UL transmission described above, two approaches may be considered. For the first approach, repetition of DL reception may be hold until a UE finishes periodic UL transmission. For the second approach, periodic UL transmission may be dropped since dynamically scheduled PDSCH may have a higher priority. In both approaches, it is necessary to determine priority between PDSCH reception and periodic UL transmission. Further, SR and SPS PUSCH may higher priority than PDSCH reception so that repetition of PDSCH reception may be hold or stopped/listened during SR/SPS PUSCH transmission. In terms of SR, only when a UE has positive SR, the SR may have higher priority than PDSCH reception. In other words, when a UE has negative SR, only SPS PUSCH may have higher priority than PDSCH reception. For SR, a UE may be allowed to stop monitoring PDSCH reception if the UE has positive SR to transmit. For PRACH, a UE should be allowed to stop monitoring PDSCH reception if the has PRACH to transmit anytime.

In summary, the behaviour of the UE in half-duplex FDD operation may be as follows.
- If a UE is scheduled with UL transmission via UL grant or PDSCH reception, the UE may switch to UL transmission. The UE may be allowed not to monitor DL reception while it is performing UL transmission.
- If a UE is periodically configured with UL transmission, which collides with PDSCH reception scheduled by DL grant (i.e. UE has detected DCI scheduling PDSCH—including unicast, random access response (RAR), Msg4, etc.), a UE may be allowed not to monitor DL reception while it is transmitting PRACH and related messages (e.g. Msg 3).
- If a UE has positive SR, the UE may be allowed not to monitor DL reception while it is transmitting SR.
- If a UE has periodic UL transmission such as SPS PUSCH, which collides with PDSCH reception scheduled by DL grant, a UE may drop periodic UL transmission on subframes colliding with PDSCH reception.

Table 4 shows another example of handling of on-going transmission and new transmission in UL transmission of half-duplex FDD operation.

TABLE 4

| On-going reception | New reception | Handling |
| --- | --- | --- |
| DL-grant PDSCH | SPS PUSCH | DL grant gets higher priority over SPS PUSCH |
| SPS PDSCH | SPS PUSCH | UL gets higher priority over DL. SPS PUSCH is transmitted |
| Other DL transmission | SPS PUSCH | UL gets higher priority |
| DL-grant PDSCH | UL-grant PUSCH | UL gets higher priority over DL (vice versa as an alternative) |
| SPS PDSCH | UL-grant PUSCH | Grant based TX gets higher priority (UL grant PUSCH gets higher priority) |
| Other DL transmission | UL-grant PUSCH | Grant based TX gets higher priority (UL grant PUSCH gets higher priority) |
| DL-grant PDSCH | Periodic SRS, CSI | DL-grant has higher priority |
| Any DL transmission | Positive SR, PRACH, aperiodic CSI, aperiodic SRS | New transmission gets higher priority |
| Positive SR, PRACH, aperiodic CSI, aperiodic SRS | DL-grant PDSCH | On-going transmission gets higher priority (may be applicable only for positive SR, PRACH) |
| Positive SR, PRACH, aperiodic CSI, aperiodic SRS | Any DL transmission | On-going transmission gets higher priority (may be applicable only for positive SR, PRACH) |

Alternatively, for all cases including UL transmission, DL reception, and half-duplex FDD operation, SPS PUSCH may get higher priority than PDSCH reception scheduled by DL grant.

Table 5 shows another example of handling of on-going transmission and new transmission in DL transmission.

TABLE 5

| On-going reception | New reception | Handling |
| --- | --- | --- |
| PDSCH | M-PDCCH (not corresponding to HARQ-ACK on PUSCH) | If two channels occur in the same narrowband, UE can monitor. If two channels occur in different narrowbands, PDSCH gets higher priority |
| DL-grant scheduled PDSCH | M-PDCCH corresponding to HARQ-ACK | DL-grant is prioritized (alternatively, always prioritize HARQ-ACK), |
| SPS PDSCH | M-PDCCH corresponding to HARQ-ACK | HARQ-ACK monitoring is prioritized if synchronous ACK is used. If asynchronous HARQ-ACK is used, SPS PDSCH is prioritized |
| Unicast PDSCH | Unicast PDSCH | If two channels occur in the same narrowband, in different PRB, it's up to UE implementation to handle the case either to receive both or drop one, UE is allowed to monitor only PDSCH at a time |
| Unicast PDSCH | RAR (either M-PDCCH or PDSCH) | RAR gets higher priority |
| Unicast PDSCH | Msg 4 (either M-PDCCH or PDSCH) | Msg4 gets higher priority |
| SPS PDSCH | DL-grant scheduled PDSCH | DL grant scheduled PDSCH gets higher priority over SPS |

TABLE 5-continued

| On-going reception | New reception | Handling |
| --- | --- | --- |
| DL-grant PDSCH | SPS PDSCH | DL grant scheduled PDSCH gets higher priority over SPS |

The same priority rule described above may be applied to the case when narrowband for on-going transmission and narrowband for new transmission is different from each other and new transmission may not be able to start unless on-going transmission needs to be stopped (e.g. PUCCH and PUSCH—if PUCCH is periodic CSI PUCCH, drop periodic CSI PUCCH and transmit PUSCH, or CSI PUCCH and HARQ-ACK PUCCH—drop early CSI PUCCH and transmit HARQ-ACK PUCCH).

In general, priority rule may be as follows.
PRACH always gets the highest priority
Aperiodic transmission triggered by the network has higher priority over periodic transmission
New transmission has higher priority over on-going transmission
ACK-NACK transmission has higher priority over data transmission (this may not be needed)

Figure 6:
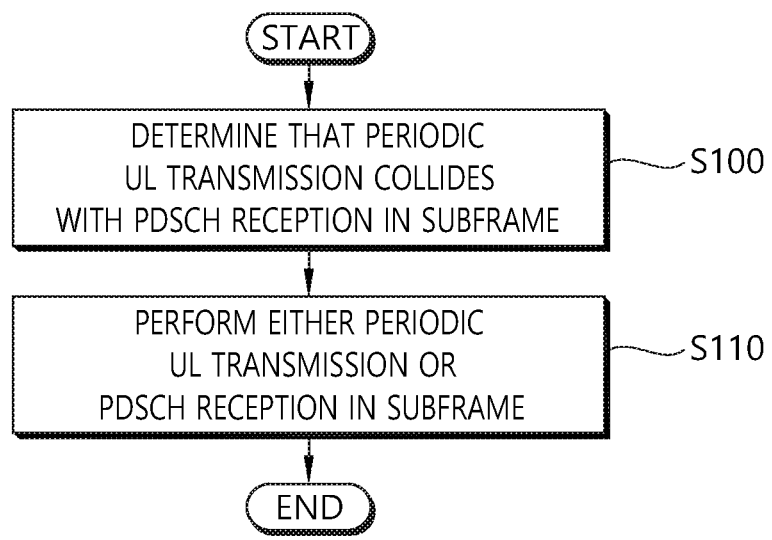
FIG. 6 shows a method for handling overlap of multiple channels by a UE, which operates in half-duplex FDD, according to an embodiment of the present invention.

FIG. 6 shows a method for handling overlap of multiple channels by a UE, which operates in half-duplex FDD, according to an embodiment of the present invention. The embodiments of the present invention described above may be applied to this embodiment. The UE may be one of a low complexity UE, a MTC UE, a BL UE or a UE in an enhanced coverage.

In step S100, the UE determines that a periodic UL transmission collides with a PDSCH reception in a subframe. In step S110, the UE performs either the periodic UL transmission or the PDSCH reception in the subframe. The PDSCH reception may be performed when the periodic UL transmission corresponds to a SPS PUSCH. In this case, the PDSCH reception may be scheduled by a DL grant. Alternatively, the periodic UL transmission may be performed when the periodic UL transmission is scheduled by a UL grant. Alternatively, the periodic UL transmission may be performed when the periodic UL transmission corresponds to a message related to a PRACH procedure. Alternatively, the periodic UL transmission may be performed when the periodic UL transmission corresponds a positive SR.

Hereinafter, a method for handling HARQ-ACK of PUSCH according to an embodiment of the present invention is described. Synchronous HARQ-ACK may be used for PUSCH. If synchronized HARQ-ACK is used for PUSCH, in some cases, the UE cannot receive UL grant or enhanced PHICH (ePHICH) due to invalid DL subframes, which causes delay of feedback timing.

Figure 7:
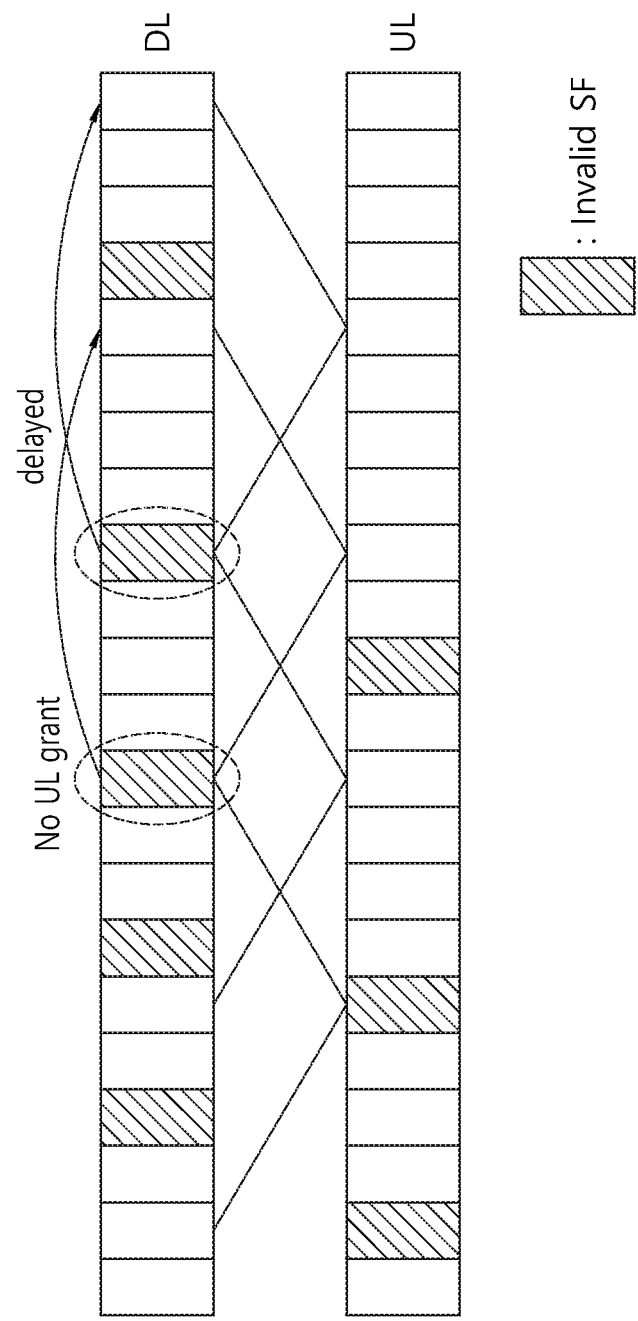
FIG. 7 shows an example of collision of synchronous HARQ-ACK feedback.

FIG. 7 shows an example of collision of synchronous HARQ-ACK feedback. Referring to FIG. 7, due to invalid DL subframes, a UE cannot receive UL grant at scheduled timing, and feedback timing may be delayed by 8 ms. This feedback timing delay may restrict UL scheduling possibilities. There are many UL subframes not used for any data transmission due to lack of UL grant. Though, those subframe can be used with SPS PUSCH, it is not easy to align valid DL subframes with SPS PUSCH. Also, due to restriction of SPS configuration, still there may be some UL subframes which are not schedulable. To handle this case, if UL grant is delayed, it will corrupt the overall synchronous HARQ-ACK timing of PUSCH. Thus, those invalid DL subframe should be skipped to the next 8 ms opportunity.

The issue with synchronous HARQ-ACK may become more significant if repetition number is more than 1 (i.e. R>1) for M-PDCCH. If R>1, the synchronous HARQ-ACK timing should be aligned with starting subframe of M-PDCCH. For this, the first starting subframe may be assigned after subframe n+3, where n is the subframe in which the last repetition of PUSCH has been transmitted. However, this approach may cause issue if repetition number for PUSCH is smaller than repetition number for M-PDCCH. Particularly, when a UE monitors multiple M-PDCCH repetition levels, this may cause some further confusion.

Figure 8:
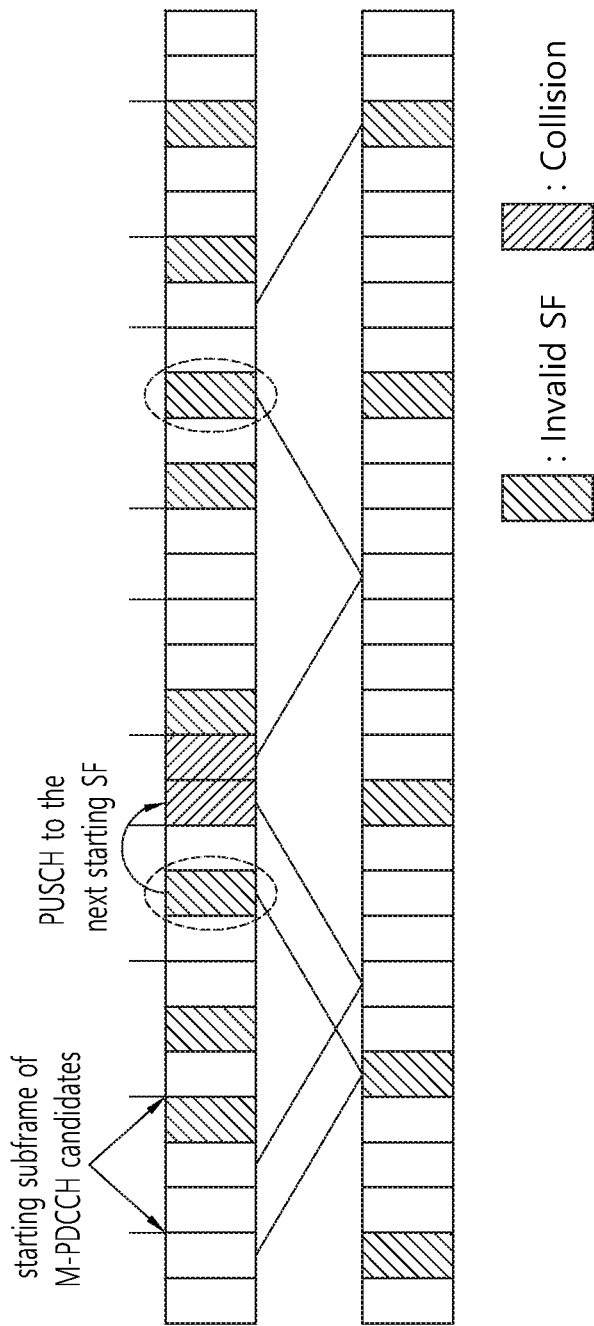
FIG. 8 shows an example of collision of synchronous HARQ-ACK feedback when repetition number for M-PDCCH is more than 1.
Figure 9:
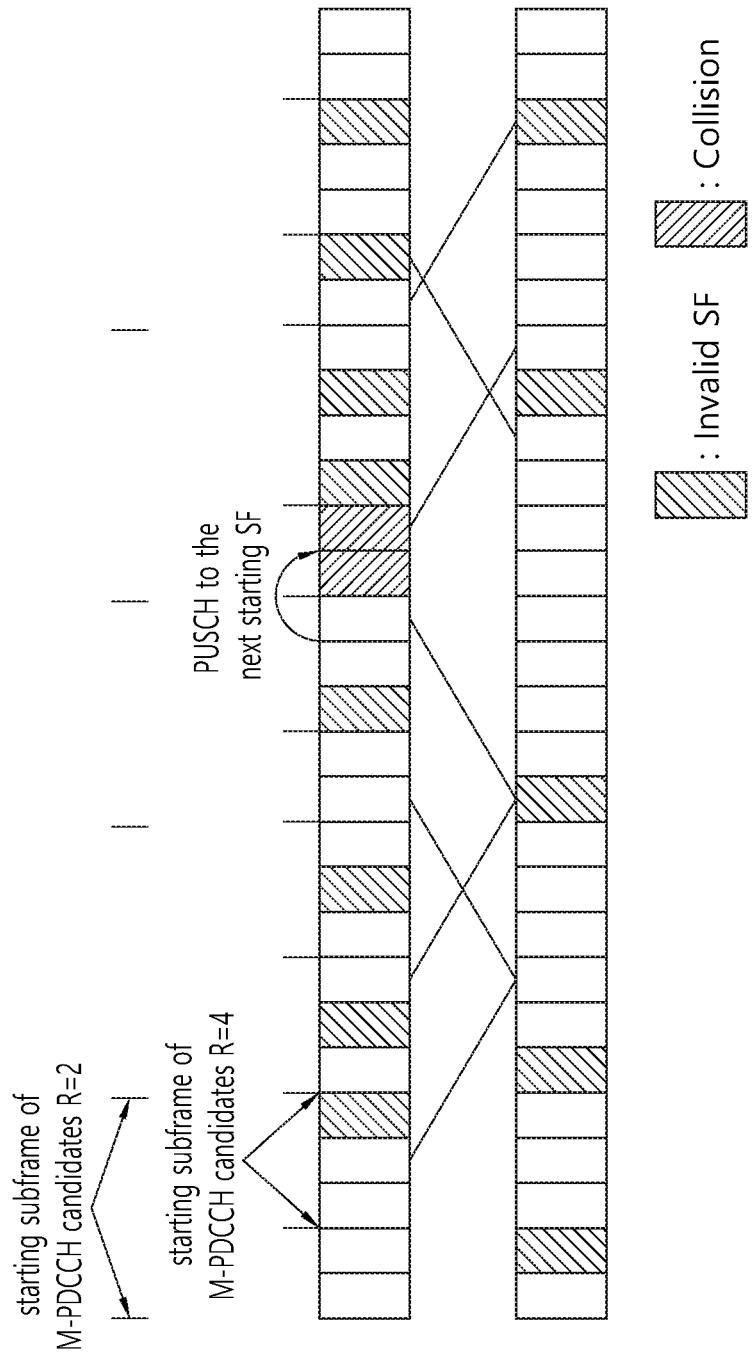
FIG. 9 shows another example of collision of synchronous HARQ-ACK feedback when repetition number for M-PDCCH is more than 1.

FIG. 8 shows an example of collision of synchronous HARQ-ACK feedback when repetition number for M-PDCCH is more than 1. FIG. 9 shows another example of collision of synchronous HARQ-ACK feedback when repetition number for M-PDCCH is more than 1. Referring to FIGS. 8 and 9, when repetition number for M-PDCCH is more than 1, due to invalid DL subframes, a UE cannot receive UL grant.

More importantly, when a UE monitors multiple M-PDCCH repetition numbers, corresponding PUSCH timing may also change. This may cause confusion in synchronous HARQ-ACK timing for PUSCH. Thus, unless the number of HARQ-process is restricted to 1, it is desirable to utilize asynchronous HARQ-ACK for PUSCH transmission. To support asynchronous HARQ-ACK for PUSCH transmission, HARQ process number may be included in UL grant.

If synchronous HARQ-ACK is used for PUSCH, the following assumptions may be necessary.
If there is no directly matching M-PDCCH starting subframe corresponding to n+4 subframe (in FDD) after the last subframe of PUSCH transmission or n+k subframe (in FDD) following the timing table, the UE may assume no ePHICH or UL grant will be received, and consider the transmission as an ACK until it requires retransmission in the next opportunity.
If multiple repetition level of M-PDCCH is used, the maximum repetition starting subframe may be used for adaptive synchronous HARQ-ACK timing. If the repetition number of PUSCH is smaller than the maximum repetition number of M-PDCCH, the first case may be followed. Alternatively, the repetition number for UL grant for retransmission may be assumed. However, this may complicate UE behaviour. Alternatively, the network may make it sure that timing may not be corrupted, where a UE uses the first available starting subframe as a timing for UL grant or PHICH. If more than one HARQ process is scheduled, it is desired to align the repetition number of M-PDCCH as well as PUSCH to avoid any confusion.

Hereinafter, timing advance (TA) update according to an embodiment of the present invention is described. It is expected that TA update may be necessary for both CE mode A and B. When a UE has received TA update, currently, a UE applies small step of TA value per each subframe. If this is used over cross-channel estimation (where each subframe may use different TA), it may cause performance degradation at the eNB side. Thus, the same TA used at least X subframes may be ensured that when cross-channel estimation is assumed. In terms of the value of X, it may be same as frequency hopping granularity regardless of hopping is used or not.

Figure 10:
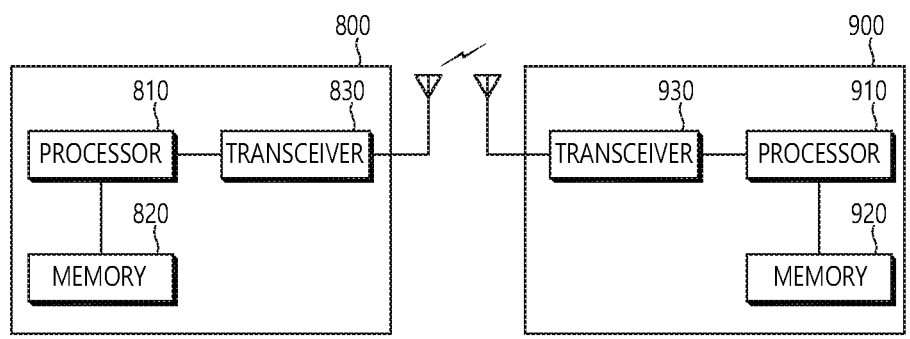
FIG. 10 shows a wireless communication system to implement an embodiment of the present invention.

FIG. 10 shows a wireless communication system to implement an embodiment of the present invention.

An eNB 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a wireless device in a wireless communication system, the method comprising:
    identifying a first subframe in which a periodic uplink (UL) transmission is scheduled, wherein the periodic UL transmission comprises a UL transmission which is based on a semi-persistent scheduling (SPS);
    identifying a second subframe in which a physical downlink shared channel (PDSCH) reception is scheduled;
    comparing a priority of the periodic UL transmission with a priority of the PDSCH reception, based on the second subframe being identical to the first subframe; and
    based on a result of the comparison, performing one of the periodic UL transmission or the PDSCH reception and dropping the other one of the periodic UL transmission or the PDSCH reception,
    wherein the wireless device operates in a half-duplex frequency division duplex (FDD).

2. The method of claim 1, wherein the PDSCH reception is performed, and
    wherein the periodic UL transmission comprises a physical uplink shared channel (PUSCH) transmission which is based on the SPS.

3. The method of claim 2, wherein the PDSCH reception is scheduled by a downlink (DL) grant.

4. The method of claim 1, wherein the periodic UL transmission is performed, and
    wherein the result of the comparison is that the priority of the periodic UL transmission is higher than the priority of the PDSCH reception.

5. The method of claim 1, wherein the periodic UL transmission is performed, and
    wherein the periodic UL transmission comprises a message related to a physical random access channel (PRACH) procedure.

6. The method of claim 1, wherein the periodic UL transmission is performed, and
    wherein the periodic UL transmission comprises a positive scheduling request (SR).

7. The method of claim 1, wherein the wireless device comprises a low complexity user equipment (UE), a machine-type communication (MTC) UE, a bandwidth reduced low complexity (BL) UE or a UE in an enhanced coverage.

8. A wireless device in a wireless communication system, the wireless device comprising:
    a memory;
    a transceiver; and
    at least one processor operatively coupled to the memory and the transceiver, wherein the at least one processor is configured to:
    identify a first subframe in which a periodic uplink (UL) transmission is scheduled, wherein the periodic UL transmission comprises a UL transmission which is based on a semi-persistent scheduling (SPS);
    identify a second subframe in which a physical downlink shared channel (PDSCH) reception is scheduled;
    compare a priority of the periodic UL transmission with a priority of the PDSCH reception, based on the second subframe being identical to the first subframe; and
    based on a result of the comparison, perform one of the periodic UL transmission or the PDSCH reception and drop the other one of the periodic UL transmission or the PDSCH reception,
    wherein the wireless device operates in a half-duplex frequency division duplex (FDD).

9. The wireless device of claim 8, wherein the PDSCH reception is performed, and
    wherein the periodic UL transmission comprises a physical uplink shared channel (PUSCH) transmission which is based on the SPS.

10. The wireless device of claim 9, wherein the PDSCH reception is scheduled by a downlink (DL) grant.

11. The wireless device of claim 8, wherein the periodic UL transmission is performed, and
    wherein the result of the comparison is that the priority of the periodic UL transmission is higher than the priority of the PDSCH reception.

12. The wireless device of claim 8, wherein the periodic UL transmission is performed, and
   wherein the periodic UL transmission comprises a message related to a physical random access channel (PRACH) procedure.

13. The wireless device of claim 8, wherein the periodic UL transmission is performed, and
   wherein the periodic UL transmission comprises a positive scheduling request (SR).

14. The wireless device of claim 8, wherein the wireless device comprises a low complexity user equipment (UE), a machine-type communication (MTC) UE, a bandwidth reduced low complexity (BL) UE or a UE in an enhanced coverage.

* * * * *